July 15, 1969 M. B. KNIGHT 3,456,075

PHASE COMPARISON CIRCUIT

Filed June 14, 1966

INVENTOR.
MARK BERWYN KNIGHT
BY
Eugene M. Whitacre
Attorney

United States Patent Office 3,456,075
Patented July 15, 1969

3,456,075

PHASE COMPARISON CIRCUIT

Mark Berwyn Knight, North Caldwell, N.J., assignor to Radio Corporation of America, a corporation of Delaware Filed June 14, 1966, Ser. No. 557,541
Int. Cl. H04n 3/16, 5/38
U.S. Cl. 178—7.3 5 Claims

ABSTRACT OF THE DISCLOSURE

An automatic frequency control circuit for synchronizing the line deflection circuit of a television receiver wherein retrace is initiated just prior to the occurrence of the synchronizing signals. Differentiated sync pulses of one polarity and differentiated pulses of opposite polarity produced in the receiver are compared to produce a control signal which is supplied to the horizontal oscillator.

Figure 2:
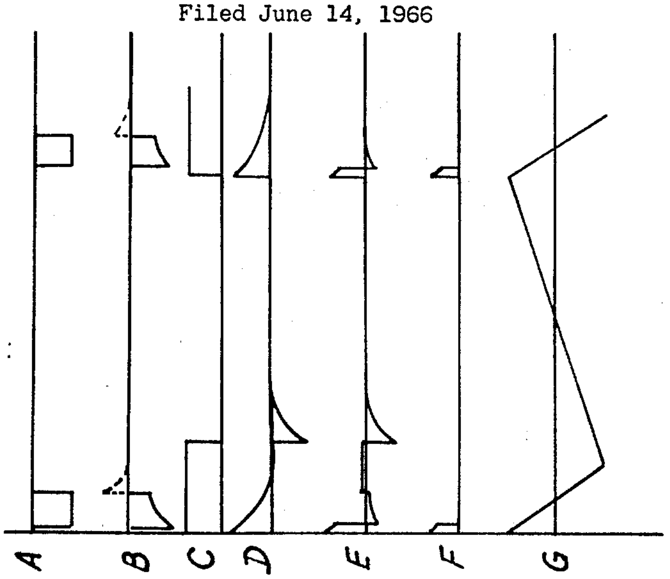

This invention relates to apparatus for producing indiactions representative of and for maintaining a time relationship of a first electrical signal with respect to a second electrical signal. More specifically, this invention relates to a phase discriminator circuit for producing a unidirectional control potential representative of the time or phase relationship between two electrical signals and the combination of such a discriminator circuit with a control circuit for maintaining a predetermined time relationship between the two electrical signals.

The invention is particularly useful in connection with an automatic frequency control (AFC) system for synchronizing the line deflection circuit of a television receiver and will be described further in connection with use in such apparatus.

In television receivers, the line or horizontal deflection circuits provide a sawtooth current waveform to deflection coils associated with a cathode ray display tube so as to sweep an image-producing electron beam across the face of the cathode ray tube in a regular scanning pattern. Horiozntal synchronizing pulses, which form part of the composite signal received and processed by the television receiver, are compared in an automatic frequency control system with a sample waveform related in time occurrence to the sawtooth current deflection waveform. The automatic frequency control system supplies a correction signal to the horizontal deflection waveform generating circuits based upon the above waveform comparison to maintain the deflection waveform in synchronism as to both phase and frequency with respect to the horizontal synchronizing pulses.

Heretofore, a number of different types of phase discriminator circuits have been utilized in AFC systems for television receivers, the most commonly used type employing a pair of diodes and resistance and capacitance elements arranged in a balanced circuit configuration. Alternative phase discriminator circuits utilizing a single active device have also been used in television receivers. (See, for example, U.S. Patent No. 2,879,391, entitled "Beam Deflection Control for Cathode Ray Devices," granted to Simeon I. Tourshou Mar. 24, 1959, and assigned to the same assignee as the present invention.)

In a television AFC circuit, the "normal" phase relationship between the synchronizing pulses and the horiozntal deflection waveform, as well as the tolerance or allowed variation from this normal relationship are of particular interest. A particularly desirable relationship exists when the deflection retrace interval is sufficiently brief and the synchronizing pulse is so timed that retrace is completed within the blanking interval provided in the transmitted composite television signal. Although this relationship may be comprromised (to permit longer retrace time—an advantage in horiozntal scanning circuits) by use of locally generated blanking signals to conceal the "fold-over" of image information, such a practice is in some respects underisable for example in color television receivers. In a color television receiver, the horizontal flyback or retrace pulse is commonly used to gate functions in additional circuits which require that the retrace pulse be completed within the transmitted blanking interval (e.g. gating of the color burst separator circuit).

It is a further desirable characteristic of a television AFC circuit that the phase comparison be made primarily with respect to the leading edge of the synchronizing pulse since each leading edge is the most precisely controlled portion of the pulse as it is produced at the transmitter.

In accordance with the present invention, an automatic frequency control system particularly adapted for use in connection with the horizontal deflection circuit of a television receiver is arranged so that the leading edge of the horizontal synchronizing pulses in conjunction with the leading edge of a pulse indicating the start of the retrace interval are used to provide a control signal. The control signal is used to maintain the horizontal deflection oscillator in timed relation with respect to the horizontal synchronizing component of a composite television signal. The circuit is arranged so that the initiation of the horizontal deflection retrace interval precedes the occurrence of the leading edge of the horizontal synchronizing pulse. In a preferred embodiment of the invention, the automatic frequency control circuit includes a semihorizontal synchronizing pulses and to a signal related conductor amplifier device responsive jointly to the in time occurence to the horizontal deflection waveform for producing a control signal.

Figure 1:
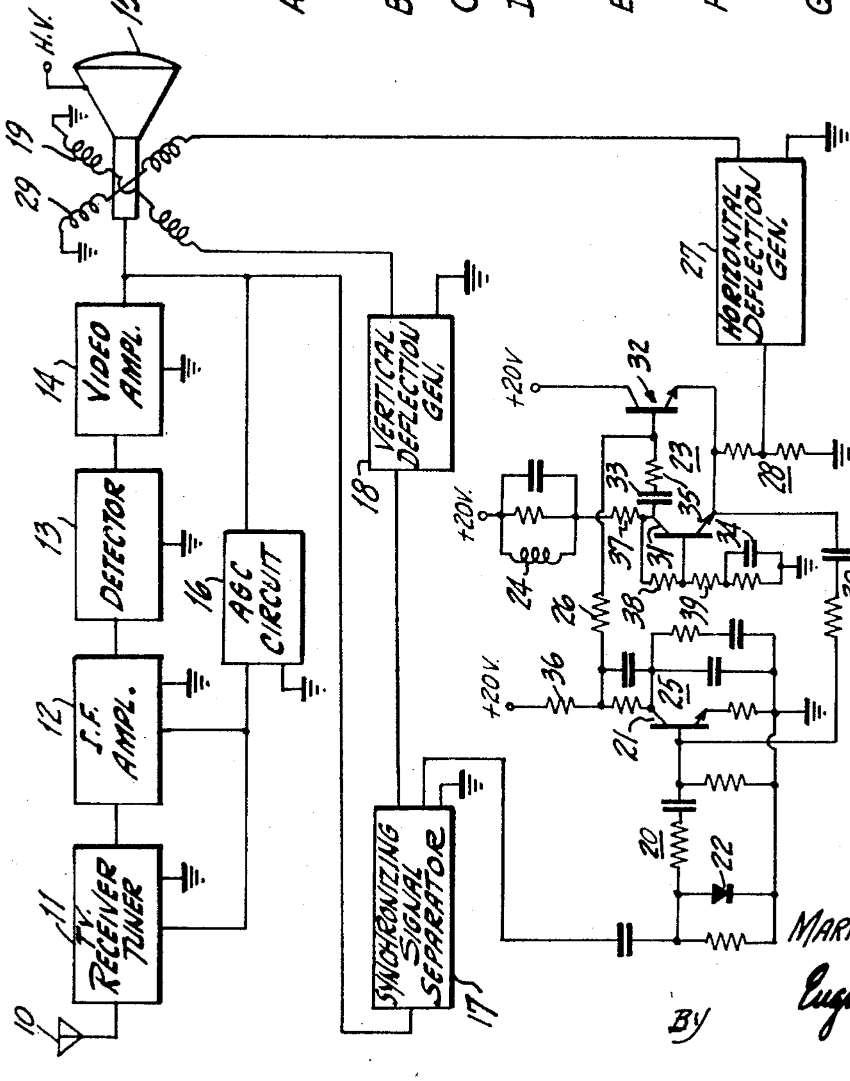

The novel features that are considered characteristic of this invention are set forth with particularity in the appended claims. The invention itself, however, both as to its organization and method of operation as well as additional objects thereof will best be understood from the following description when read in connection with the accompanying drawing in which:

FIGURE 1 is a schematic circuit diagram, partially in block diagram form, of the monochromatic image-reproducing portion of a television receiver employing the invention; and FIGURE 2 is a series of waveform diagrams, drawn to a common time scale, to which reference will be made in the explanation of the operation of the circuit of FIGURE 1.

Referring to FIGURE 1, the monochromatic image reproducing portion of a television receiver is shown in large part in block diagram form since the overall construction thereof is well known.

The television receiver includes an antenna 10 for receiving composite television signals and for coupling such signals to a television receiver tuner 11. The tuner 11 normally includes one or more radio frequency amplifier stages tunable to a plurality of frequencies corresponding to television broadcast signals and a frequency converter for converting the radio frequency signals to intermediate frequency (I-F) signals. The receiver further includes an I-F amplifier 12 and a detector 13, the latter serving to derive composite television signals, including image-representative components and synchronizing signal components, from the intermediate frequency signals. A video amplifier 14 coupled to the output of detector 13 supplies amplified monochromatic image-representative components of the composite television signal to a control electrode (e.g. the cathode) of a television kinescope 15. The output of video amplifier 14 also is coupled to an automatic gain control (AGC) circuit 16, the latter, in turn, being coupled to the R-F amplifier stages in tuner 11 and to I-F amplifier 12 to control the gain thereof in accordance with the amplitude of the received signal and thereby maintain the output of video amplifier 14 substantially constant over a wide range of input signal levels. Synchronizing signal components of the amplified composite television signal are coupled from video amplifier 14 to a synchronizing signal separator circuit 17.

Sync separator circuit 17 is arranged to derive horizontal and vertical synchronizing components from the composite television signal. The vertical synchronizing pulses are supplied to a vertical deflection signal generator 18. Vertical deflection signal generator 18 is arranged to provide a substantially sawtooth deflection waveform at the field rate (e.g. 60 cycles per second) to a vertical deflection winding 19 associated with kinescope 15.

Periodic horizontal synchronizing pulses derived from sync separator 17 are coupled by means of a wave-shaping circuit 20 to the base electrode of an NPN phase discriminator transistor 21 which forms a part of an automatic frequency control (AFC) circuit constructed in accordance with the present invention. Wave-shaping circuit 20 comprises a combination of resistance and capacitance elements arranged to differentiate the horizontal synchronizing pulse waveform and a clipping diode 22 for removing portions of the differentiated waveform which are of a polarity tending to initiate conduction in transistor 21 (i.e. positive polarity pulses).

A horizontal oscillator circuit 23 shown as an emitter-coupled bistable multivibrator including a sine wave stabilizing coil 24 is coupled by means of an integrating network 25 and a resistor 26 to the output (collector) electrode of discriminator transistor 21. A horizontal deflection waveform generating circuit 27 is coupled across a portion of the emitter load 28 of oscillator 23 and provides a sawtooth current waveform to a horizontal deflection winding 29 associated with kinescope 15.

The output of oscillator 23, which is in fixed time relation with respect to the sawtooth curent wavefom, is also coupled by means of a second differentiating circuit 30 to the base electrode of discriminator transistor 21 for comparison with the differentiated synchronizing pulses as will be explained more fully below.

Referring to the waveform diagrams shown in FIGURE 2, the operation of the circuits shown in FIGURE 1 now will be described. In the oscillator 23, the transistors 31 and 32 alternately are switched between conductive and non-conductive states as coupling capacitor 33 and bias capacitor 34 are charged and discharged in a recurring sequence. A substantially rectangular waveform is thereby produced across emitter load 28 (waveform C). Specifically, assuming transistor 31 is conducting and transistor 32 is non-conducting, the following operating sequence takes place. Since transistor 31 is conducting, a positive voltage is developed across emitter load 28 and is applied to the emitter of transistor 32. At the same time, as a result of an earlier cycle, capacitor 33 is charged such that the base electrode of transistor 32 is less positive than the emitter electrode thereof. Transistor 32 is therefore non-conductive. Capacitor 33 then begins to discharge through a circuit which, for simplicity, may be considered as comprising resistor 35, resistor 26, resistor 36, the voltage supply (+20 v.), sine wave coil 24 and resistor 37. The voltage at the base electrode of transistor 32 becomes increasingly positive until transistor 32 is switched into conduction. The voltage across emitter load 28 rises rapidly towards the supply voltage (+20 v.) thereby switching transistor 31 to a non-conductive state. Capacitor 34 charges towards a positive voltage via resistors 38 and 39 until the voltage at the base of transistor 31 is sufficiently positive with respect to the emitter thereof to switch transistor 31 into conduction. As transistor 31 switches into the conduction, the collector voltage thereof and hence the base voltage of transistor 32 drops so as to switch transistor 32 into a non-conductive state. The timing of the above-described switching cycle is dependent upon circuit parameters (e.g. resistance, capacitance, supply voltage) involved in the discharging and charging operations. The timing sequence may be adjusted by varying such parameters and in the illustrated embodimeint, such timing is substantially controlled by varying the voltage produced across integrating network 25.

The required control voltage is produced across integrating network 25 in the following manner. Negative polarity horizontal synchronizing pulses (waveform A) are supplied from sync separator circuit 17. The negative synchronizing pulses are differentiated in wave-shaping circuit 20 wherein the positive polarity portions for the differentiated waveform (i.e. those portions tending to turn discriminator transistor 21 "on"—see dotted portions of waveform B) are removed by diode 22.

At the same time, the rectangular waveform output of oscillator 23 (waveform C) is differentiated by means of differentiating network 30 (see waveform D) and the differentiated oscillator output is applied to the base electrode of discriminator transistor 21. For tight phase tolerance of the circuit, the leading edge of waveform C rises rapidly and the trailing edge is made to decay rapidly, but not so rapidly as to impair the stability of the circuit.

The positive portion of waveform D (differentiated oscillator output) tends to increase conduction in discriminator transistor 21 while the negative differentiated sync pulse input tends to decrease conduction in transistor 21. The combination of the two waveforms (see waveform E) is applied to the base of transistor 21. If oscillator 23 begins, for any reason, to increase its operating frequency, waveform D will shift to the left with respect to waveform B, thereby increasing conduction (waveform F) of discriminator 21. Integrating network 25 will then produce a compensating voltage for application to the charging circuit of capacitor 33 to return oscillator 23 to the desired relationship with respect to the horizontal synchronizing pulses. It should be noted that discriminator transistor 21 conducts during substantially every cycle to maintain the voltage across integrating network 25 at a level sufficient to maintain synchronization. The polarities of the two waveforms applied to transistor 21 are arranged such that the positive going leading edge of the waveform C, corresponding to the beginning of the retrace interval, tends to turn the transistor on just prior to the occurence of the synchronizing pulse. The negative going leading edge of the synchronizing pulse (waveform B), which is precisely controlled at the transmitter relative to the trailing edge, tends to turn the transistor 21 off. The period between the two aforementioned leading edges provides an accurate measure of the phase relationship between the horizontal deflection oscillator and the horizontal synchronizing pulses. In prior circuits which use the entire synchronizing pulse to develop the AFC control voltage the phase tolerance tends to be quite wide. However, the control voltage developed in the present circuit is a function of the accurately controlled leading edge of the synchronizing pulse and thus provides a very close phase tolerance.

Thus, circuits embodying the invention have the desirable characteristic that the retrace interval is initiated just prior to the occurrence of the horizontal synchronizing pulses thereby permitting a relatively long retrace interval while still maintaining the retrace interval within the horizontal blanking period. It may be noted that the longer retrace time eases the requirements on the horizontal output stage with respect to breakdown voltage and turn-off time. This is particularly important where the active device in the horizontal output stage is a transistor. In addition the use of the precisely controlled leading edge of the horizontal synchronizing pulse in the generation of the AFC voltage permits tighter control of phase tolerance.

What is claimed is:

1. In a television receiver, a combination comprising means providing a source of synchronizing pulse signals, a deflection waveform generating circuit for producing a recurring deflection waveform including trace and retrace portions, an oscillator circuit coupled to apply a driving signal to said generating circuit so that the initiation of said retrace portion occurs prior to the occurence of said synchronizing pulses, means coupled to said oscillator circuit for producing a reference pulse signal having a rapidly changing leading edge timed to occur substantially at the initiation of said retrace portions, control circuit means coupled to receive said synchronizing and reference pulse signals and responsive to the interval between the leading edge of said reference pulse signals and the leading edge of said synchronizing pulse signals for providing a control voltage representative of said interval, and means for applying said control voltage to said oscillator to maintain a predetermined phase relation between said synchronizing pulse signals and said deflection waveform, said phase relation being characterized by initiation of said retrace portions occurring prior to the occurrence of said synchronizing pulses.

2. In a television receiver, a combination according to claim 1 wherein said control circuit comprises an amplifying device having an input circuit to which said synchronizing and reference pulse signals are applied, and an output circuit including an integrating network for providing said control voltage to said oscillator, said control voltage being dependent upon conduction of said amplifying device.

3. In a television receiver, a combination comprising means providing a source of synchronizing pulse signals, a deflection waveform generating circuit for producing a recurring deflection waveform including trace and retrace portions, an oscillator circuit coupled to apply a driving signal to said generating circuit so that the initiation of said retrace portion occurs prior to the occurence of said synchronizing pulses, means coupled to said oscillator circuit for producing a reference pulse signal timed to occur substantially at the initiation of said retrace portions, a control circuit coupled to receive said synchronizing and reference pulse signals and responsive to the interval between the leading edge of said reference pulse signals and the leading edge of said synchronizing pulse signals to provide a control voltage, said control circuit comprising an amplifying device having an input circuit to which said synchronizing and reference pulse signals are applied, and an output circuit including an integrating network for providing said control voltage to said oscillator, said control voltage being dependent upon conduction of said amplifying device, and means for applying said control voltage to said oscillator to maintain a predetermined phase relation between said synchronizing pulse signals and said deflection waveform, wherein said reference pulse signal producing means includes a wave shaping network for causing said reference pulse signal to be characterized by a waveform of a first polarity having a steep leading edge and a trailing edge which decays relatively fast, and wherein said synchronizing pulse source is arranged to provide to said control circuit pulse signals of a polarity opposite to that of said reference pulse signals.

4. In a television receiver, the combination according to claim 3 wherein said reference pulse signals are of a polarity to produce conduction in said amplifying device and said synchronizing pulse signals are of opposite polarity.

5. In a television receiver, the combination according to claim 4 wherein the leading edge of said reference pulse signals drive said amplifying device into conduction and said synchronizing pulse signals drive said amplifying device to cut-off.

References Cited

UNITED STATES PATENTS 3,038,033 6/1962 Kingsford-Smith ---- 178—69.5

RICHARD MURRAY, Primary Examiner

ROBERT L. RICHARDSON, Assistant Examiner

U.S. Cl. X.R.

178—69.5; 331—20